(12) United States Patent
Huang et al.

(10) Patent No.: US 8,559,902 B2
(45) Date of Patent: Oct. 15, 2013

(54) OPERATION METHOD AND RADIO DEVICE FOR CONTROLLING POWER SWITCH OF RADIO BASED ON MOVING SPEED

(75) Inventors: Polly Huang, Taipei (TW); Po-Yen Lin, Taipei (TW); Ling-Jyh Chen, Taipei (TW); Jyh-How Huang, Taipei (TW)

(73) Assignee: National Taiwan University, Taipei (TW)

( * ) Notice: Subject to any disclaimer, the term of this patent is extended or adjusted under 35 U.S.C. 154(b) by 161 days.

(21) Appl. No.: 12/915,841

(22) Filed: Oct. 29, 2010

(65) Prior Publication Data

US 2012/0034877 A1    Feb. 9, 2012

(30) Foreign Application Priority Data

Aug. 6, 2010   (TW) .............................. 99126194 A

(51) Int. Cl.
*H04B 1/06* (2006.01)
*H04B 7/00* (2006.01)
*H04M 1/10* (2006.01)
*H04B 1/38* (2006.01)

(52) U.S. Cl.
USPC ...................................... 455/238.1; 455/574

(58) Field of Classification Search
USPC .......... 455/67.11, 67.14, 569.2, 456.1, 456.2, 455/456.3, 575.9, 572, 571, 441, 238.1, 574
See application file for complete search history.

(56) References Cited

U.S. PATENT DOCUMENTS

| | | | |
|---|---|---|---|
| 5,991,627 A | 11/1999 | Honkasalo et al. | |
| 6,975,602 B2 * | 12/2005 | Anderson | ................... 370/328 |
| 7,089,009 B1 | 8/2006 | Fauconnier | |
| 8,055,279 B2 * | 11/2011 | Murakami | ................. 455/456.6 |
| 2008/0165737 A1 * | 7/2008 | Uppala | ........................ 370/331 |
| 2008/0176583 A1 | 7/2008 | Brachet et al. | |
| 2008/0209046 A1 | 8/2008 | Karkanias et al. | |

* cited by examiner

*Primary Examiner* — Eugene Yun
(74) *Attorney, Agent, or Firm* — Rosenberg, Klein & Lee

(57) ABSTRACT

An operation method and a radio device for controlling a power switch of a radio based on moving speed. The radio device includes a speed estimator and an operator. The speed estimator is used for estimating the moving speed of the radio device, and the operator is used for comparing the moving speed of the radio device with a speed threshold value so as to turn on/off the power switch of the radio device. The power switch of the radio device can be controlled based on the moving speed so as to decrease the time the radio device stays on, thus reducing the power consumption of the radio device.

15 Claims, 3 Drawing Sheets

OPERATION METHOD AND RADIO DEVICE FOR CONTROLLING POWER SWITCH OF RADIO BASED ON MOVING SPEED

FIELD OF THE INVENTION

The present invention is related to an operation method and a radio device for controlling power switch of radio based on moving speed, with the power switch of the radio device controlled based on moving speed to decrease the time the radio is on, so that the power consumption of the radio device is reduced.

BACKGROUND OF THE INVENTION

The radio device utilizing a short range radio can replace a general mobile device utilizing a long range radio. The method that allows a message to be transmitted from its source radio device to a target radio device is by forwarding the message to other radio devices the source encounters. These radio devices further forward the message to other radio devices they encounter opportunistically until the message reaches the target radio device. This way, users don't need to pay the telecommunication charges sending data messages in area where there are frequent radio device encounters.

In the past, to increase the usage time of the radio devices, the duty cycle of the radio device may have been controlled by some method. One of the operation times would be set as the "on state" and the other operation time would be set as the "off state" during the duty cycle of the radio device. For example, if the duty cycle of the radio device were one minute, the front 10 seconds of the duty cycle would have been set as the "on state" and the back 50 seconds of the duty cycle would have been set as the "off state." Therefore, the power consumption of the radio device would be reduced by decreasing the time needed for the radio device to be on, so that the usage time of the radio device could be prolonged.

However, if the radio device is turned on/off periodically, following problems arise.

For example, if a radio device needs to exchange a data message with another device in its vicinity, but has been turned off by the periodic on-off method, it will be unable to perform the data exchange.

On the other hand, a radio device being turned on by the periodic on-off method can perform a data exchange, but there may be no other radio device in its vicinity. As a result, the power of the radio device would be wasted.

Furthermore, when the radio device exchanges a data message with a neighboring radio device, the radio device may suddenly be turned off by the periodic on-off method, resulting in failure for the data exchange.

Therefore, how to provide a power switch mechanism suitable for the conditions under which the radio device will be used, so that the radio device can achieve efficiency in saving power and smoothly exchange data messages with other radio devices, is the object to be achieved by the present invention.

SUMMARY OF THE INVENTION

It is one object of the present invention to provide an operation method and a radio device for controlling power switch of radio based on moving speed, where the moving speed of the radio device is estimated, and thereafter the power switch of the radio device is controlled based on estimated speed of movement so as to decrease the time taken to turn on the radio device, so that power consumption of the radio device is reduced.

It is another object of the present invention to provide an operation method and a radio device for controlling power switch of radio based on moving speed, where the user of the radio device may tend to slow down the moving speed because of people passing each other. At the same time, the radio device used by the user is turned on to exchange at least one data message with another radio device used by the encountered user when the moving speed of the user is below a certain speed threshold value.

To achieve the above objects, the present invention provides an operation method for controlling power switch of radio based on moving speed, comprising the steps of: estimating a moving speed of a radio device; and comparing the moving speed with a speed threshold value, wherein if the moving speed being is below the speed threshold value the power switch of the radio device is turned on.

The present invention further provides a radio device for controlling power switch of radio based on moving speed, comprising: a speed estimate used for estimating a moving speed of a radio device; and an operator, connected to the speed estimator, used for comparing the moving speed with a speed threshold value to turn on/off the power switch of the radio device.

DETAILED DESCRIPTION OF THE INVENTION

Figure 1:
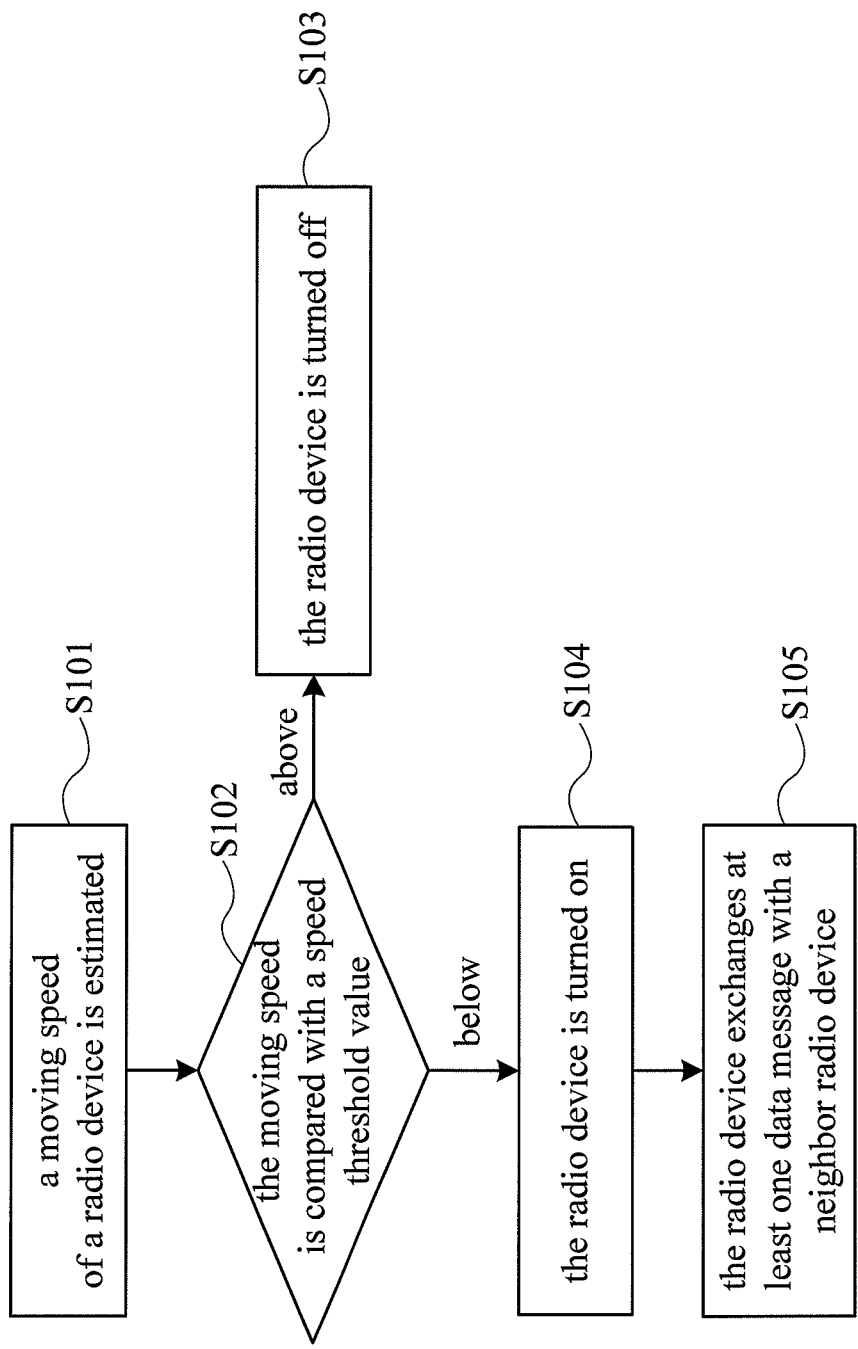
FIG. 1 shows a flow chart of an operation method for controlling power switch of radio based on moving speed according to a preferred embodiment of the present invention.
Figure 2:
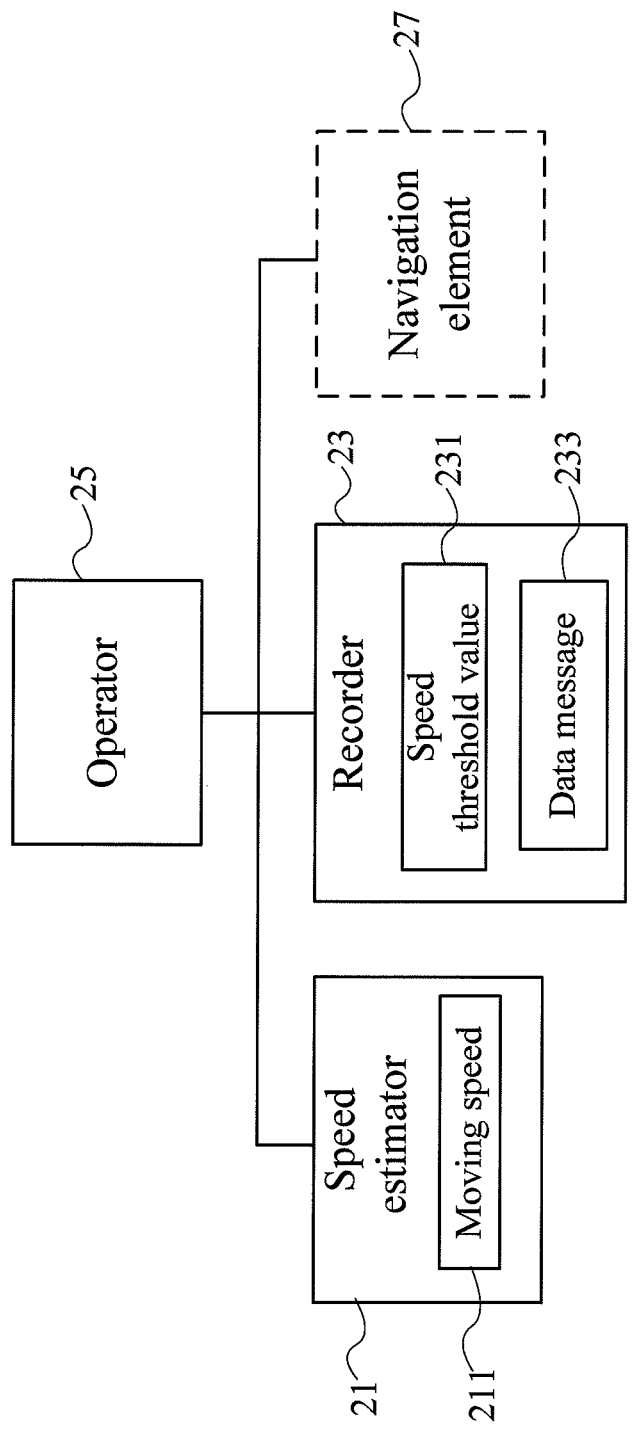
FIG. 2 shows a circuit diagram for controlling power switch of radio based on moving speed according to a preferred embodiment of the present invention.

Referring to FIG. 1 and FIG. 2, which show a flow chart of an operation method and a circuit diagram for controlling power switch of radio based on moving speed according to a preferred embodiment of the present invention. In the present invention, the radio device 200 comprises a speed estimator 21 and an operator 25.

First, as described in step S101, the speed estimator 21 is used for estimating a moving speed 211 of the radio device 200. The radio device 200 is equipped with a user or a vehicle (e.g., bicycle, car, motorcycle) utilized by the user, and the moving speed 211 is the walking speed of the user or the traveling speed of the vehicle. Furthermore, the speed estimator 21 is an accelerometer, a pedometer, or a sensor with detectable displacement speed.

In step S102, the operator 25 is used for comparing the moving speed 211 with a speed threshold value 231 to decide whether the moving speed 211 is above the speed threshold value 231. In the present invention, the radio device 200 further comprises a recorder 23, which is used for recording the speed threshold value 231 and at least one data message 233, with the operator 25 being connected to the speed estimator 21 and recorder 23, respectively.

In addition, the speed threshold value 231 established within the radio device 200 can be adjusted relative to the various conditions on which the user will be walking on the different road and/or using different vehicles. For example, if the user walks on a rugged mountain road, which is difficult to walk, the speed threshold value 231 can be established as a lower value (such as 0.5 m/s); if the user walks on a flat road, which is much easier to walk on, the speed threshold value 231 can be established as a higher value (such as 1 m/s); or if the vehicle (e.g., bicycle) utilized by the user travels on a flat road, the speed threshold 231 can be established as a much higher value (such as 3 m/s).

In step S103, the power switch of the radio device 200 is turned off (also known as stand by mode) when the moving speed 211 is above the speed threshold value 231. Oppositely, in step S104, the power switch of the radio device 200 is turned on when the moving speed 211 is below the speed threshold value 231.

The present invention further comprises a step S105, where the moving speed 211 of the radio device 200 may tend to slow down because of people or cars passing each other. The radio device 200 is turned on and senses whether another radio device 200 is within the vicinity when the moving speed 211 of the radio device 200 is already below the speed threshold value 231. If there is other neighbor radio device 200 near the radio device 200, the radio device 200 exchanges at least one data message 233 with the other radio device 200. Additionally, the data message 233 recorded within the recorder 23 is provided by the radio device 200 itself or the exchanged message from the other radio device 200.

In the present invention, the power switch of the radio device 200 can be turned on/off based on people having decelerating behavior when people passing each other, in such a way the time taken to turn on can be decreased substantially so as to reduce the power consumption of the radio device 200.

Sequentially, the user of the radio device 200 usually slows down the moving speed 211 gradually when people or cars pass each other, which allows the power switch of the radio device 200 to remain in a "turn-on state" for a period of time, with this time being enough for the exchange of data messages between the two radio devices 200 to be completed. Besides, in accordance with conventional experience, the moving speed 211 of the user will not substantially accelerate before the user is far away from the encountered person or vehicle, therefore, the two radio devices 200 will be prevented to turn off suddenly during the exchange of the data message 233, which would result in a failure to exchange data.

Further, each of the radio devices 200 exchanges data with others through an opportunistic network, and the data message 233 can be exchanged instantly when the radio device 200 has sensed a neighboring radio device 200.

The radio device 200 further comprises a navigation element 27 (e.g. GPS). The navigation element 27 is used for locating the position, trajectory, and time of the radio device 200 to generate a position information that will be integrated within the data message 233. When the user with the radio device 200 encounters other people, the data message 233, which contains the position information, within the radio device 200 can be exchanged with other radio devices 200 used by other people so as to allow other people to keep track of the aforementioned user. In another embodiment of the present invention, the position, trajectory, and time of the radio device 200 located by the navigation element 27 can be further provided to the speed estimator 21 to assist the speed estimator 21 accurately estimate the moving speed 211 of the radio device 200.

Figure 3:
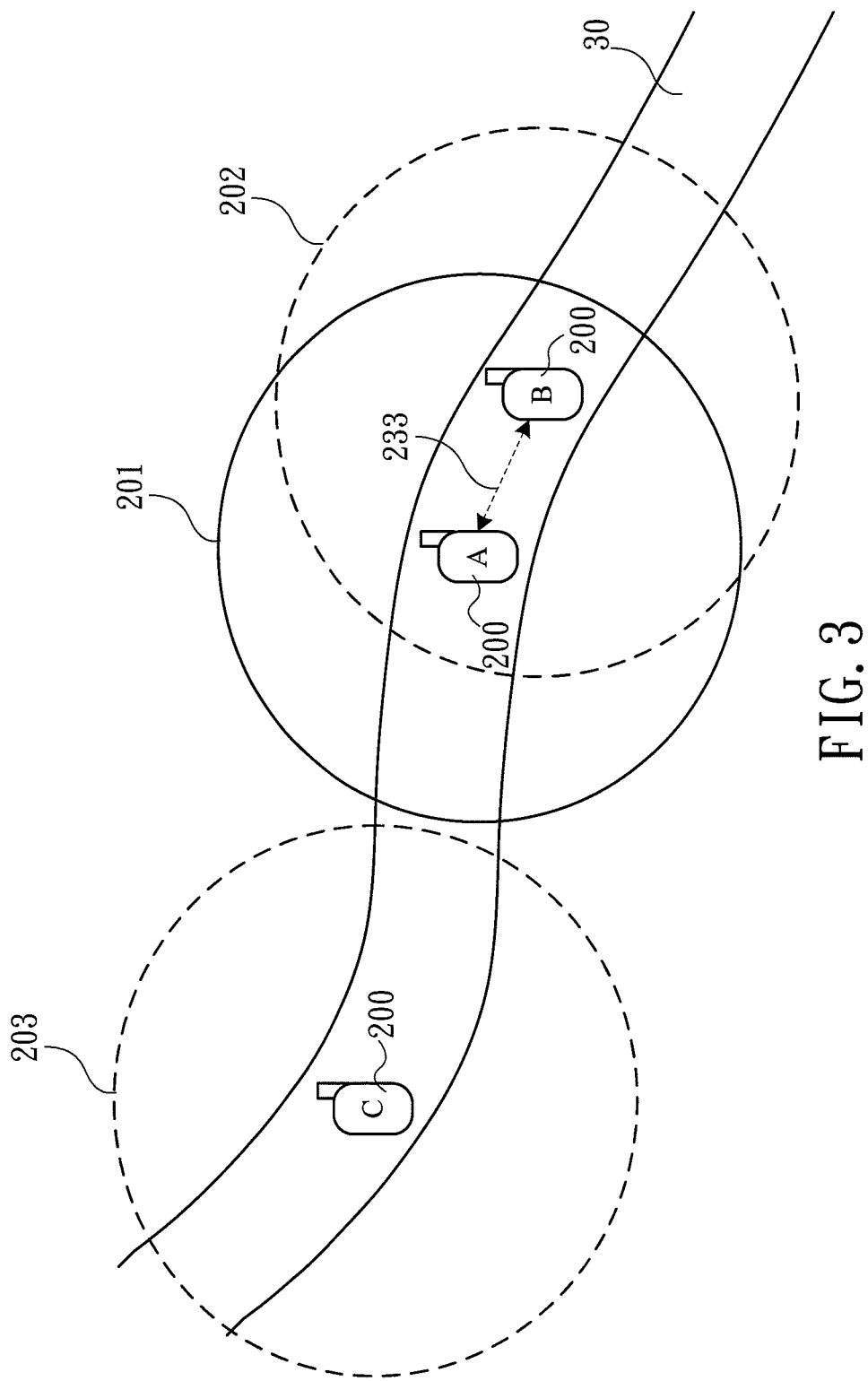
FIG. 3 shows a state diagram for exchanging the data message between the radio devices according to one application embodiment of the present invention.

Referring to FIG. 2 and FIG. 3 simultaneously, wherein FIG. 3 shows a state diagram for exchanging the data message between the radio devices according to one application embodiment of the present invention. Each of the radio devices 200 of the present embodiment can be applied to the mountaineering.

As shown in FIG. 3, there are three users respectively equipped the radio devices (A)(B)(C) 200 walking on the mountain road 30, and each of the radio devices 200 comprises a sensing range 201/202/203, respectively. When the user with the radio device (A) 200 is walking forward to encounter the user with the radio device (B) 200, the two users will slow down to yield or chat, and therefore their moving speeds 211 will be below the speed threshold value 231, which turns on the users' radio devices 200. At the moment, both will be located within the mutual sensing range 201/202 to exchange the data message 233 containing the position information for each other. Thereafter, if the user with the radio device (A) 200 is missing, the searching process for his/her whereabouts can utilize the position information previously recorded within the radio device (B) 200.

Also, the radio device (C) 200 has not yet to be located within the sensing range 201/202 of the radio device (A)/(B) 200, and therefore the radio device (C) 200 will not exchange any data message 233 with the radio device (A)/(B) 200.

The present invention can be applied to group activities, such as tourism. The leader of the tourist group uses the radio device 200 to issue the data message 233, which contains a notification information (such as the rendezvous time for the group), to other radio devices 200 used by the members of the tourist group, and the data message 233 can be transmitted between each of the radio devices 200, so that each tourist group member can received the tourist group leader's notice successfully.

Further, the present invention can be applied to transportation, and the radio device 200 can be equipped with a vehicle, such as a car. When cars pass each other, the radio device 200 receives the traffic information in advance from another radio device 200.

The above embodiments are representations of only a few of the applications for the invention, with the contents of the data message 233 being of course relative to the different situations to which they are being applied, so as to exchange different forms of data messages 233 between radio devices 200.

The foregoing description is merely one embodiment of the present invention and is not to be considered restrictive. All equivalent variations and modifications in shape, structure, feature, and spirit in accordance with the appended claims may be made without in any way limiting the scope of the invention.

What is claimed is:

1. An operation method for controlling a power switch of a radio based on moving speed, comprising the steps of:

estimating a moving speed of a radio device having a radio module selectively energized by a power switch therefor; and comparing said moving speed with a speed threshold value adaptively set according to a movement history of said radio device, wherein if said moving speed is below said speed threshold value, the power switch of said radio module is turned on and a neighboring radio device sensing operation is executed; if said moving speed of said radio device is above said speed threshold value, the power switch of said radio module is turned off, wherein, responsive to a neighboring radio device being sensed, said radio device exchanges or transfers at least one data message with the neighboring radio device, and said radio device will be prevented from exchanging or transferring the data message with the neighboring radio device when the power switch of said radio module is turned off.

2. The operation method according to claim 1, further comprising the steps of:
commanding said radio device to exchange at least one data message with a neighboring radio device.

3. The operation method according to claim 2, wherein each of said radio devices exchanges data with others through an opportunistic network.

4. The operation method according to claim 2, wherein said data message comprises at least one position information, at least one notification information, at least one traffic information, or other type of information.

5. The operation method according to claim 4, wherein said radio device comprises a navigation element, used for locating said radio device to generate said position information.

6. The operation method according to claim 1, wherein said radio device comprises a speed estimator, used for estimating said moving speed of said radio device.

7. The operation method according to claim 6, wherein said speed estimator is an accelerometer, a pedometer, or a sensor with detectable displacement speed.

8. The operation method according to claim 1, wherein said radio device is attached to a user or a vehicle, and said moving speed is the walking speed of the user or the traveling speed of the vehicle.

9. A radio device for controlling a power switch of a radio based on moving speed, comprising:
a speed estimator, used for estimating a moving speed of a radio device, said radio device having a radio module selectively energized by a power switch therefor; and
an operator, connected to said speed estimator, used for comparing said moving speed with a speed threshold value adaptively set according to a movement history of said radio device to turn on/off the power switch of said radio module, wherein the power switch of said radio module is turned off when said moving speed is above said speed threshold value, and the power switch of said radio module is turned on and a neighboring radio device sensing operation is executed when said moving speed is below said speed threshold value, wherein, responsive to a neighboring radio device being sensed, said radio device exchanges or transfers at least one data message with the sensed neighboring radio device, and said radio device will be prevented from exchanging or transferring the data message with the neighboring radio device when the power switch of said radio is turned off.

10. The radio device according to claim 9, further comprising a recorder, used for recording said speed threshold value and at least one data message, and connected to said operator, wherein said radio device exchanges said at least one data message with a neighboring radio device when said radio device is turned on.

11. The radio device according to claim 10, wherein each radio device exchanges data with others through an opportunistic network.

12. The radio device according to claim 10, wherein said data message comprises at least one position information, at least one notification information, at least one traffic information, or other type of information.

13. The radio device according to claim 12, wherein said device comprises a navigation element, used for locating said radio device to generate said position information.

14. The radio device according to claim 9, wherein said speed estimator is an accelerometer, a pedometer, or a sensor with detectable displacement speed.

15. The radio device according to claim 9, wherein said radio device is attached to a user or a vehicle, and said moving speed is the walking speed of the user or the traveling speed of the vehicle.

* * * * *